United States Patent [19]
Pan et al.

[11] Patent Number: 5,386,490
[45] Date of Patent: Jan. 31, 1995

[54] AUTOMATED WORKSTATION FOR THE MANUFACTURE OF OPTICAL FIBER COUPLERS

[75] Inventors: Jing-Jong Pan, Milpitas; Frank Y. F. Liang, San Jose; Ming M. Shih, Milpitas; Zhong M. Mao, Santa Clara; Kung Shih, San Jose, all of Calif.

[73] Assignee: E-Tek Dynamics, Inc., San Jose, Calif.

[21] Appl. No.: 86,629

[22] Filed: Jul. 1, 1993

[51] Int. Cl.⁶ .............................. G02B 6/00; G02B 6/36
[52] U.S. Cl. .................................... 385/134; 385/95
[58] Field of Search ............... 385/134, 137, 95, 97

[56] References Cited

U.S. PATENT DOCUMENTS

| | | | |
|---|---|---|---|
| 4,736,632 | 4/1988 | Case | 385/134 X |
| 4,854,667 | 8/1989 | Ebata et al. | 385/134 |
| 4,895,423 | 1/1990 | Bilodeau et al. | 350/96.15 |
| 5,191,632 | 3/1993 | Mansfield et al. | 385/134 |

Primary Examiner—Akm E. Ullah
Attorney, Agent, or Firm—Townsend and Townsend Khourie and Crew

[57] ABSTRACT

The present invention provides for a workstation for automatically manufacturing a coupler between at least two optical fibers. The workstation has a control unit for directing operations of said workstation and an operations unit for performing the manufacturing steps for the coupler. The operations unit has a pair of clamps for holding the optical fibers for the formation of a coupling region between the clamps, a torch for heating a predetermined length of the fibers between the clamps to fuse the fibers, motor assemblies responsive to the control unit for driving the clamps, a source laser block for generating an input signal into the optical fibers, and a laser measurement block which measures the signal from laser source block to determine characteristics of the coupling region between the optical fibers.

20 Claims, 16 Drawing Sheets

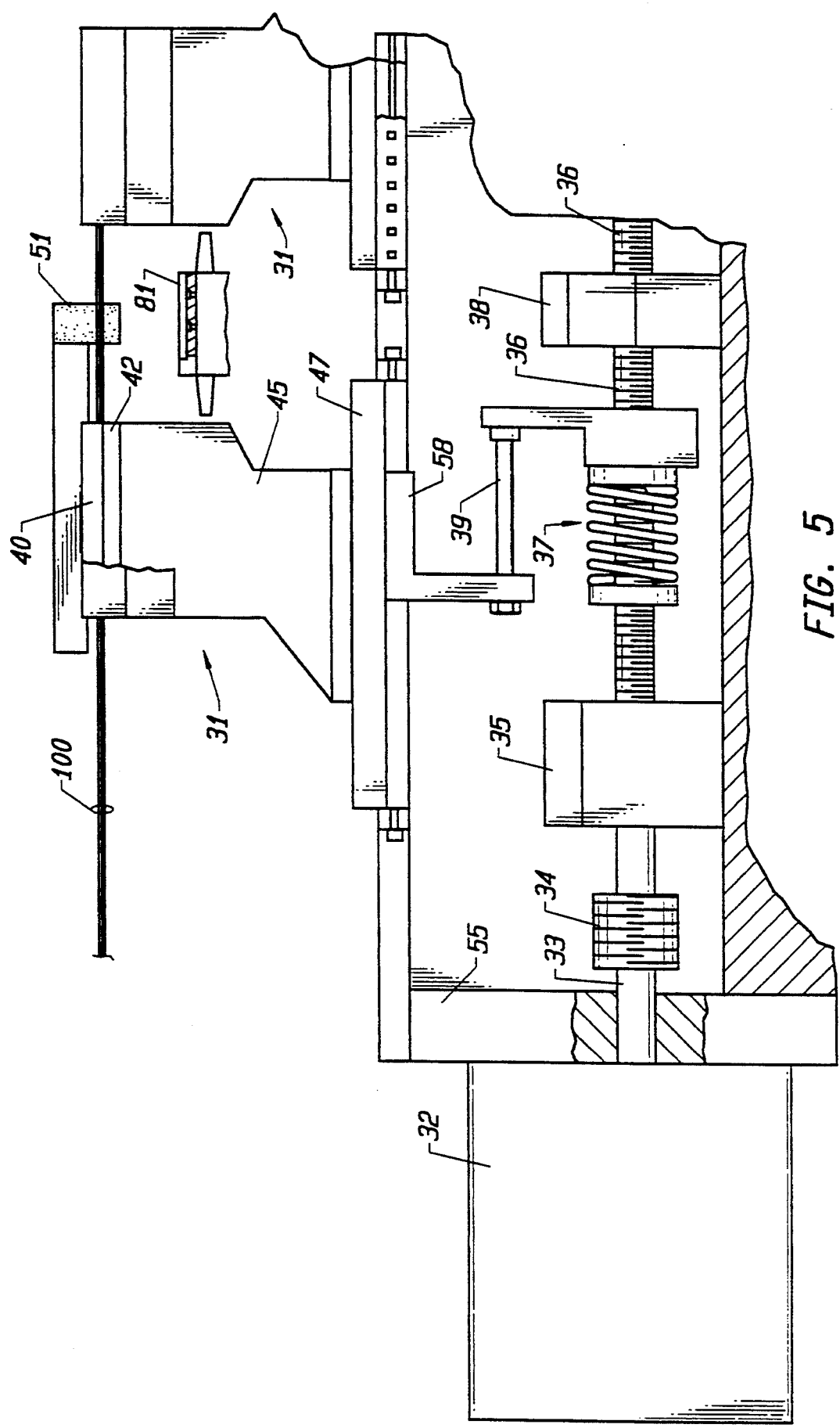

FABRICATION PROGRAM

1. Initialize and display ready message.
2. Get time, date, pulling motor position, read PDs, calculate CRs and EL.
3. Display time, date, pulling motor position, PDs, CRs and EL.
4. System Check:  Link check       -Display link normal or failure message.
    Gas leak check   -Shut off gas flow and alarm operator on gas leak.
5. Activate appropriate routine if button is pressed.

| | | | |
|---|---|---|---|
| Operation buttons: | a. RECAL | Recalibrate |
| | b. HOME | Home |
| | c. PPULL | Pre-Pull |
| | d. PULL | Pulling |
| | e. PULL++ | Pull++ |
| | f. PACK/DEPACK | Packaging and Depacking |
| | g. PST | Polarization |
| | h. Next... | Next operation |
| | i. ZERO | Record PD offsets |
| | j. STOP | Stop current operation |
| | k. EXIT | Quit fabrication program |
| Vacuum buttons: | l. Pull Left | Left pulling vacuum |
| | m. Pull Right | Right pulling vacuum |
| | n. Package | Packaging vacuum |
| Heater button: | o. OFF | Heater control |
| | p. AUTO | Auto heater control |
| Gas Flow button: | q. OFF | Turn gas flow ON/OFF manually |

6. Goto 2.

Operation Buttons

RECAL (Recalibrate)

1. Initialize and display operation message.
2. If fabrication data has not been saved, save to data base.
3. Move motors a few steps away from home position.
4. If motor stops but still remains at home position, display error message and wait for operator clicking on "OK" button and then goto 8.
5. Move motors MAX_STEP toward home position.
6. If motor stops but not at home position, display error message and wait for operator clicking on "OK" button and goto 8.
7. Move motors to ready position.
8. Display next operation message.
9. Return to fabrication program.

FIG. 8A

HOME (Homing)

1. Initialize and display operation message.
2. If fabrication data has not been saved, save it to data base.
3. Move packaging holder and torch backward to home position.
4. Move fiber holder to starting-offset position.
5. Move fiber holder to starting position.
6. Display next operation message.
7. Return to fabrication program.

PPULL (PrePull)

1. Move torch forward to fusion position.
2. Delay preset Pull Delay time.
3. Move fiber holder outward a preset step.
4. Return to fabrication program.

PULL (Pulling)

1. Initialize and display operation message.
2. Move torch forward to fusion position.
3. Delay preset Pull Delay time.
4. Move fiber holder outward.
5. Stop fiber holder when PD readings reach preset settings or fiver holder position reach its limit of the "STOP" button has been pressed.
6. Move torch to home position.
7. Delay preset Stop Delay time.
8. Keep the CRs, EL, pulling length data in memory for record.
9. Display next operation message.
10. Return to fabrication program.

PULL++ (Pull++)

1. Move fiber holder outward 20 steps.
2. Return to fabrication program.

PACK (Packaging)

1. If fiber holder gap is too narrow, display warning message and goto 6.
2. Initialize and display operation message.
3. Move packaging holder forward to the position below the fused fiber.
4. Move packaging holder upward to the packaging position.
5. Display next operation message.
6. Return to fabrication program.

FIG. 8B

DEPACK

1. Initialize display operation message.
2. Turn off package vacuum valve.
3. Move packaging holder downward to starting position.
4. Move packaging holder backward to home position.
5. Display next operation message.
6. Return to fabrication program.

PST (Polarization)

1. Initialize and display operation message.
2. Return polarization controller to home position.
3. Move quarter lambda controller to starting position.
4. Move half lambda controller one step at a time from starting position (home) to stopping position and collect PD readings on each step.
5. Calculate PST from collected PD readings. [PST (%) = CR (max.) - CR (min.)]
6. Keep PST value in memory for record.
7. Display next operation message.
8. Return to fabrication program.

NEXT... (Next Operation)

Next button will activate the next operation.

| | Current Operation | Next Operation |
|---|---|---|
| a. | Pulling Vacuums ON | b. |
| b. | PULL | c. |
| c. | Package Vacuum ON | d. |
| d. | PACK | e. |
| e. | Auto Heat | f. |
| f. | DEPACK | g. |
| g. | PST | h. |
| h. | Pulling Vacuums OFF | i. |
| i. | HOME | a. |

ZERO (Record PD Offsets)

1. Record PD Offsets.
   - "Yes"    -record PD offsets
   - "No"     -clear PD offsets
   - "Cancel" -no change
2. Return to fabrication program.

FIG. 8C

STOP (Stop current operation)

1. Depending on the current operation routine, different action will be performed.

| Current Operation | Action |
   |---|---|
   | RECAL | -Stop all operating motors |
   |  | -Stop all operation timers |
   |  | -Goto step 8 in RECAL routine |
   | HOME | -Stop fiber holder |
   |  | -Goto step 6 in HOME routine |
   | PULL | -Goto step 6 in PULL routine |
   | PACK | -Stop packaging holder |
   |  | -Goto step 5 in PACK routine |
   | Auto Curing | -Turn off heat and stop curing timer |
   | DEPACK | -Stop packaging holder |
   |  | -Goto step 5 in DEPACK routine |
   | PST | -Stop polarization controller |
   |  | -Goto step 7 in PST routine |

2. Return to fabrication program.

EXIT (Quit fabrication program)

1. If data has not been saved, save it to data base.
2. Stop all timers.
3. Save all motor positions to data file.
4. Return to main program.

Vacuum Buttons

Pull Left

1. Toggle ON/OFF left pulling vacuum valve.
2. Return to fabrication program.

Package

1. Toggle ON/OFF packaging vacuum valve.
2. Return to fabrication program.

Heater Buttons

ON/OFF

1. Toggle ON/OFF heater
2. Return to fabrication program.

FIG. 8D

Auto (Auto curing)

1. Initialize and display operation message.
2. Start curing timer and turn on heat.
3. Turn OFF heat after curing time expired or "STOP" button has been pressed.
4. Display next operation message.
5. Return to fabrication program.

FIG. 8E

FABRICATION DATA FILE

| ... Data Field | Data Format | Unit | Description |
| --- | --- | --- | --- |
| 1. Station ID | Integer | | Station ID Number |
| 2. Operator ID | Integer | | Operator ID Number |
| 3. Lot Number | String (10) | | Lot number of coupler |
| 4. Coupler Number | Integer | | Number that assign to this coupler |
| 5. Wavelength | Integer | nm | Wavelength of laser diode |
| 6. CR Spec | String (9) | | Required CR Specification |
| 7. Date | Date | | Date of fabrication |
| 8. Time | String (8) | | Time of fabrication |
| 9. Pref | Float | μW | PD reference during fabrication |
| 10. EL | Float | dB | Excess loss of coupler |
| 11. CR | Float | % | Coupling ratio of coupler |
| 12. PST | Float | % | Polarization of coupler |
| 13. Pull Length | Float | mm | Pulling length of coupler |

QUALIFIED RECORDS DATA FILE

| Data Field | Data Format | Description |
| --- | --- | --- |
| 1. Record Number | Integer | Record number in fabrication data file. |

STATISTICAL ANALYSIS

1. Define record selection criterias.
2. Start from the first records of fabrication data file.
3. Compare each fabrication record with the record selection criterias, store the record number of qualified record into qualified record data file and collect qualified record data to calculate the statistics.
4. Repeat step 3 until the last record of fabrication data file.
5. Display statistical results on screen.

DISPLAY QUALIFIED RECORDS

1. Records that match the record selection criterias are stored in qualified records data file.
2. Available record display option:
   - TOP — Display the first qualified record data
   - BOTTOM — Display the last qualified record data
   - NEXT — Display next qualified record data
   - PREV — Display previous qualified record data
   - Record Number — Display qualified record data of a specific record number

FIG. 9A

PRINT QUALIFIED RECORDS

1. Check to include printing sections:
   a. Selection Criteria
   b. Statistic Results
   c. Data base Records - Check to include record fields
2. If "a" from step 1 is selected, format and write selection criterias to print file.
3. If "b" from step 1 is selected, format and write statistic results to print file.
4. If "c" from step 1 is selected,
   a. Start from first qualified record
   b. Format and write included field data to print file.
   c. Repeat step "b" until end of data file.
5. Print out print file.

FIG. 9B

AUTOMATED WORKSTATION FOR THE MANUFACTURE OF OPTICAL FIBER COUPLERS

BACKGROUND OF THE INVENTION

The present invention is related to manufacturing techniques for optical fiber couplers and, more specifically, to the automated manufacturing of such couplers.

Fiber optic couplers are used to connect optical fibers so that an optical, i.e., light, signal in a fiber passes to one or more fibers, or optical signals from several fibers pass to a single fiber. Networks of optical fibers with numerous couplers are being used with increasing frequency for the transmission of data, voice and video information due to the high transmission capacity of optical fibers, among other reasons.

In a typical coupler a single input fiber joins two output fibers to form a 1×2 coupler, or two input fibers join two output fibers to form a 2×2 coupler. Other combinations are possible. In a general manufacturing process of such couplers, two or more optical fibers having their outer coating removed are brought together and placed in contact with each other. The fibers may, or may not, be twisted together, depending upon the particular technique used to manufacture the coupler. The fibers are fused together by heat, as the fibers are placed under tension by slowly and carefully pulling them apart at a predetermined rate.

Heretofore, great care in handling the delicate fibers have been required by highly trained technicians with manual, or at best, semi-automated equipment. Thus the manufacturing costs for couplers are relatively high with production volumes low. This situation is an impediment to the desirable spread of fiber optic networks.

The present invention solves or substantially mitigates these problems with an automated workstation for fiber optic couplers.

SUMMARY OF THE INVENTION

The present invention provides for a workstation for automatically manufacturing a coupler between at least two optical fibers. The workstation has a control unit for directing operations of said workstation and an operations unit for performing the manufacturing steps for the coupler. The operations unit has a pair of clamps for holding the optical fibers for the formation of a coupling region between the clamps, a torch for heating a predetermined length of the fibers between the clamps to fuse the fibers, motor assemblies responsive to the control unit for driving the clamps, a source laser block for generating an input signal into the optical fibers, and a laser measurement block which measures the signal from laser source block to determine characteristics of the coupling region between the optical fibers.

BRIEF DESCRIPTION OF THE DRAWINGS

FIG. 5 is a detailed side view of the drive assembly of the fiber clamp of FIG. 4.

FIGS. 8A–8E list the programs which operate through the control unit 11 in pseudocode form.

FIGS. 9A–9B list the database programs which are used with the operation programs of FIGS. 8A–8E.

DETAILED DESCRIPTION OF PREFERRED EMBODIMENTS

Figure 1:
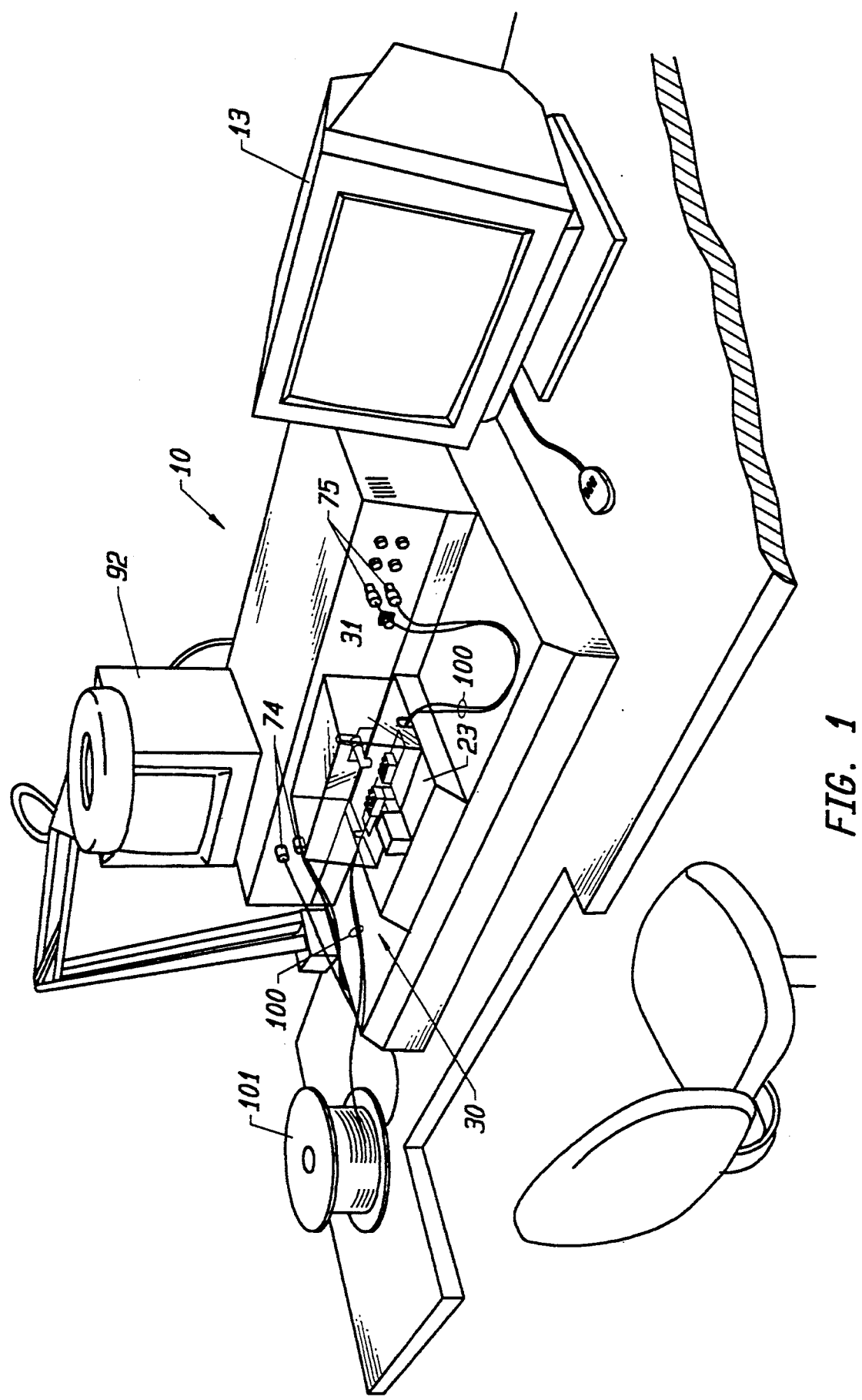
FIG. 1 is a perspective view of the workstation according to the present invention.

FIG. 1 shows a view of an automated workstation in accordance with the present invention. The workstation has an operations unit 10 and a control unit 11 in front of which an operator is seated. The operations unit 10 performs the steps to manufacture a coupler under the direction of the control unit 11, here represented by a display monitor 13. Through the control unit 11, the workstation may be programmed so that the different couplers with different parameters may be built.

Figure 2:
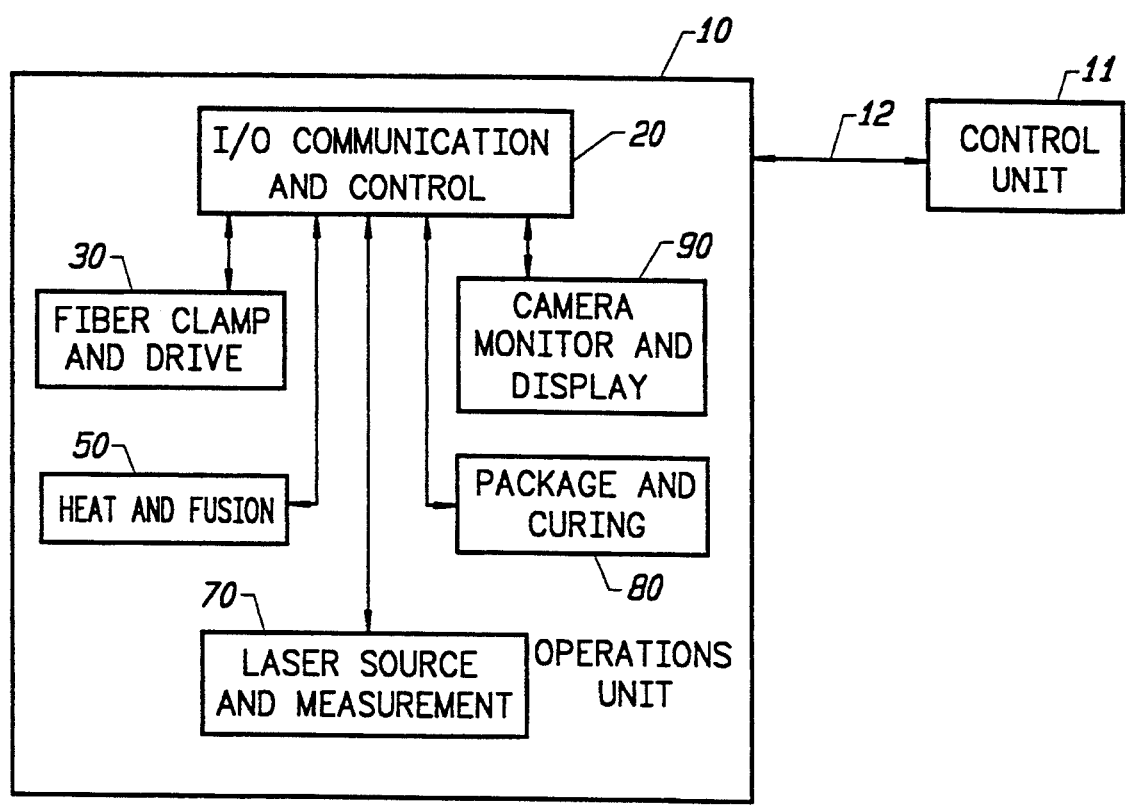
FIG. 2 is a block diagram illustrating the general organization of the workstation of FIG. 1.

The general organization of the operations unit 10 and the control unit 11 is represented in FIG. 2. The control unit 11, in the form of a personal computer, communicates with the operations unit 10 over two multimode optical fibers 12. The operations unit 10 has an input/output communication and control subsystem 20, a fiber clamp and drive subsystem 30, a heating and fusion subsystem 50, a laser source and measurement subsystem 70, a package and curing subsystem 80, and a process monitoring camera and display subsystem 90. It has been found that the electrical operations of the control unit 11 may disrupt the precise operations of the unit 10 and the optical link of the fibers 12 reduces the likelihood and effects of such electrical interference.

Figure 3:
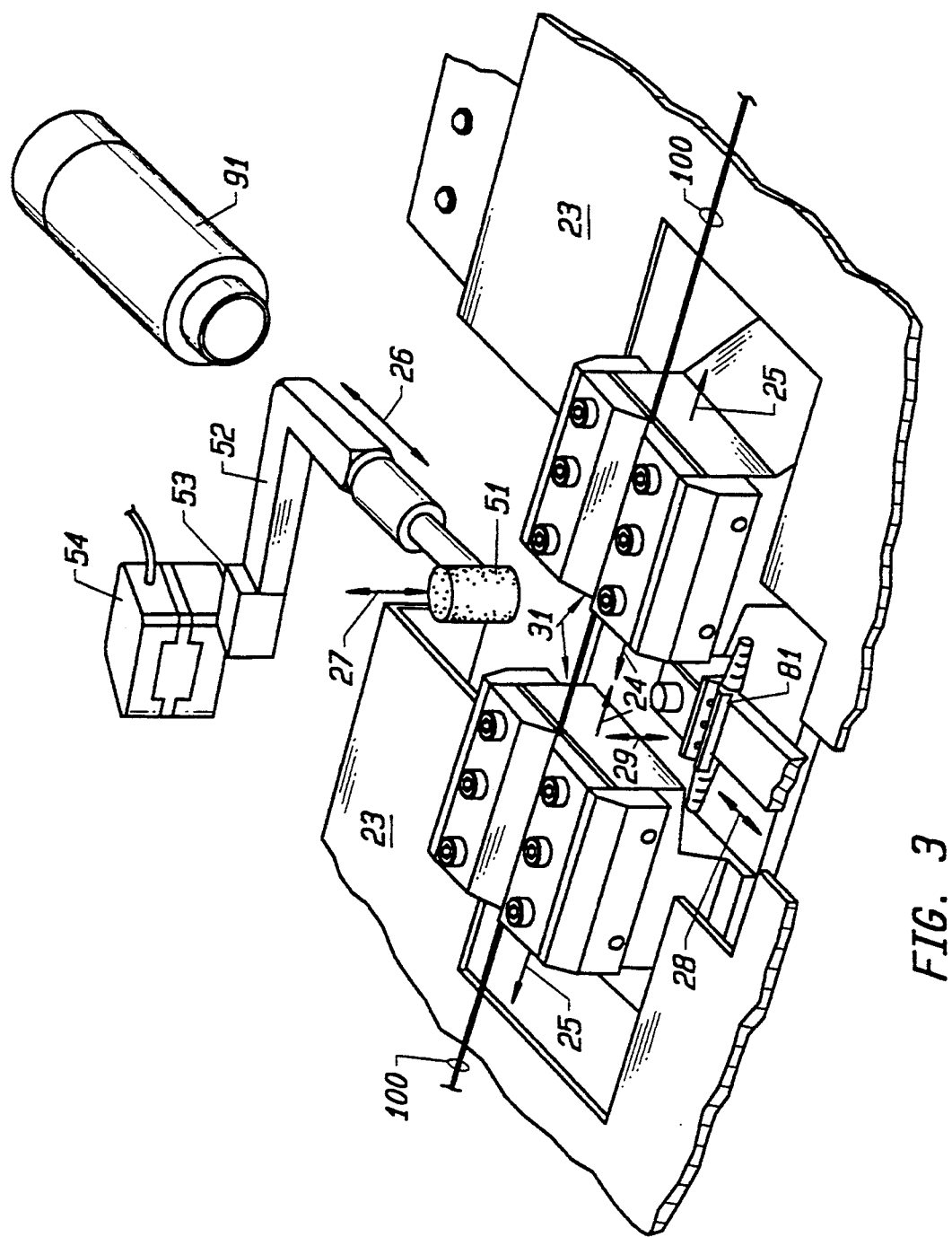
FIG. 3 is a perspective and detailed view of part of operations unit of FIG. 1.

Parts of the operations unit 10, which are directly involved in the manufacture of couplers are shown in a cutaway and detailed view of FIG. 3. In FIG. 1 this part of the operations unit 10 lies under a transparent plastic covering 31 which protects a coupler from contaminants. FIG. 3 shows two clamps 31 of the fiber clamp subsystem 30 holding a pair of optical fibers, shown collectively by the reference numeral 100. The fibers 100 are held in each clamp 31 by vacuum. The clamps 31 move toward and away from each other during operation as indicated by arrows 24 and 25 respectively. A cover 23 protects the mechanism which drives the clamps 31.

A torch 51, part of the heating and fusion subsystem 50, provides the heat necessary for any fusing operation of the clamped fibers 100. The heating torch 51 is moved toward the fibers 100 for a fusion operation and moved away otherwise. Arrows 26 and 27 respectively illustrate the lateral and vertical motion of the torch 51. Also shown in FIG. 3 are a prepackage holder 81 of the package and curing subsystem 80. The holder 81 carries a prepackage into place against the fibers 100 so that epoxy placed on the fibers and prepackage may be cured by heaters within the holder 81. Arrows 28 and 29 respectively illustrate the horizontal and vertical movement of the prepackage holder 81 during its operation.

Finally, FIG. 3 shows a camera 91 of the process monitoring camera and display subsystem 90. The camera 91 allows a detailed view of the manufacturing process between the clamps 31.

Figure 4:
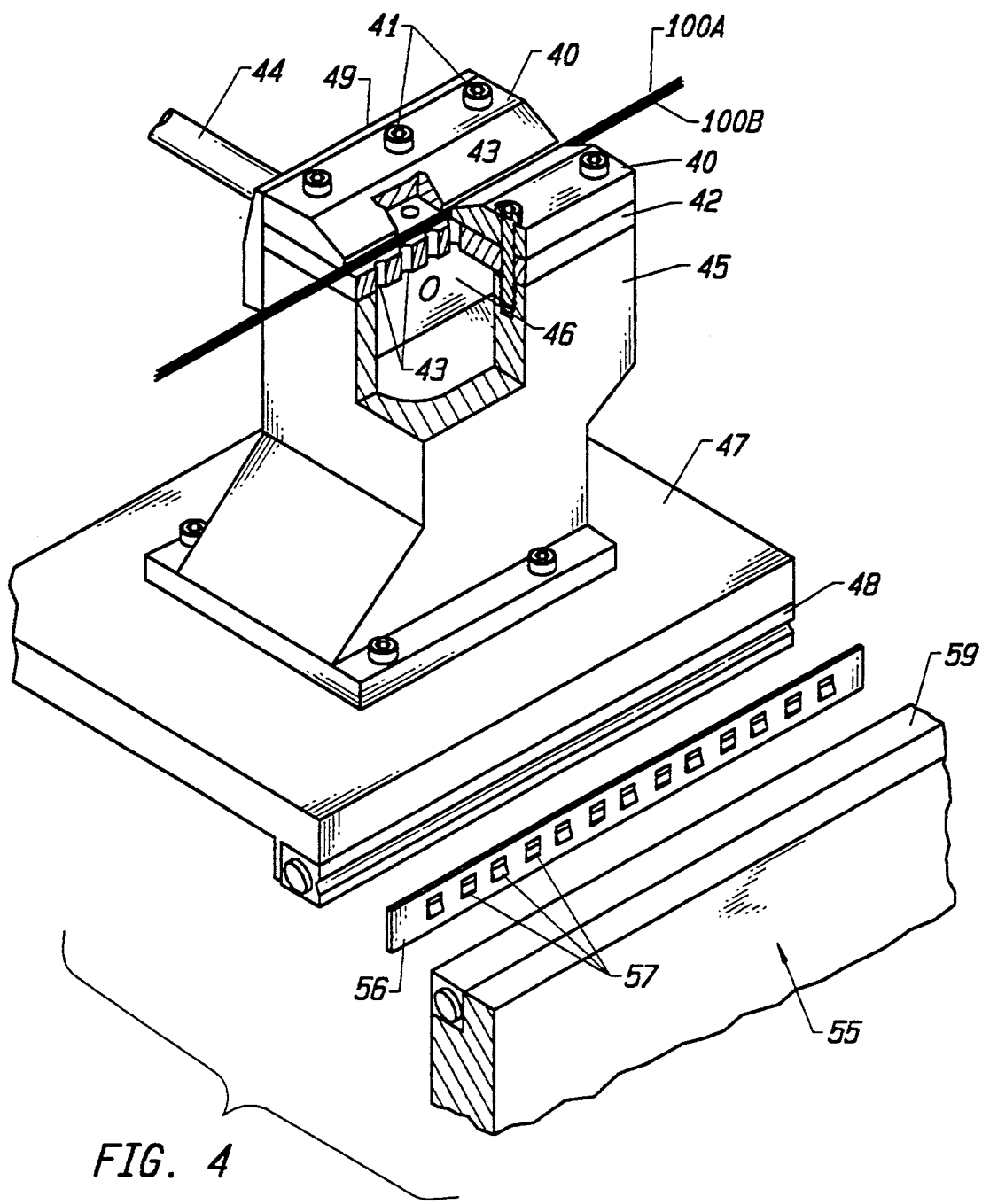
FIG. 4 is an cutaway view of a fiber clamp assembly of the operations unit of FIG. 1.

FIG. 4 shows the details of the assembly for a fiber clamp 31. The clamps 31 are designed to hold the optical fibers 100 securely without damaging them and to provide a smooth and controlled pull on the fibers 100 in the coupler manufacturing process. The assembly has a base 45 with a channel 46 for the vacuum to clamp the optical fibers, here shown as two separate fibers 100A and 100B. The channel within the base 45 communicates with a flexible tube 44 which has an end fixed to the base 45. The other end of the flexible tube 44 is connected to a vacuum pump (not shown). A vacuum distribution plate 42 rests on the top flat surface of the base 45. The plate 42 has a linearly arranged series of holes 43 which communicate with the channel 46. A pair of clamp surface plates 40 lie on the plate 42 and are fixed to the base 45 by machine screws 41 which fit through holes in the plates 40 and 42. Each plate 40 has a beveled upper surface 40A which leads to a plate edge 40B. The two plates 40 are mounted so that the edges 40B are positioned parallel to each other over the holes 43 of the distribution plate 42. The edges 40B are slightly separated from each other to form a linear and beveled opening which receives optic fibers 100A and 100B. The air pressure from the vacuum in the channel 46 through the holes 43 holds the fiber 100 in place. To provide an alignment reference for the plates 40, a side plate 49 is mounted to the base 45. One of the plates 40 is mounted against the side plate 49 to fix the location of its edge 40B and the edge 40B of the second plate 40 can then be located.

The bottom of the clamp assembly has a carriage base 47 upon which the base 45 is mounted. A bearing surface 48 is fixed along the bottom edge of carriage base 47. A second bearing surface 59 is attached to the housing 55 for the clamps 31. To ensure that the two races 48 and 59 slide easily past each other, a thin bearing plate 56 with apertures holding cylinder roller bearings 57 is placed between the races. It should be understood that there is a similar arrangement of bearing surfaces and bearings on the other side of the carriage base 47 to form parallel races for the clamps 31. This permits each clamp 31 to slide back and forth as indicated in FIG. 3.

FIG. 5 shows the details of the drive assembly for each of the clamps 31. A stepper motor 32, mounted to the housing 55, has a shaft 33 which is connected through a coupling 34 to a reduction gear box 35. The gear box 35, mounted to the housing, has a drive screw 36 with a journal at the far end which is held in place by a support 38, also fixed to the housing, containing a journal bearing. Note that the support 38 also receives a drive screw 36 for the second clamp 31. Mounted on the drive screw 36 is a drive screw carriage 37, which moves along the drive screw 36 backward or forward, depending upon the direction of the rotation of the motor 32. The drive screw carriage 37 has an arm which extends upward toward the assembly for the clamp 31. The carriage base 47 of the clamp assembly has a clamp undercarriage 58 which has an arm which extends downward toward the drive screw carriage 37. The arms of the drive screw carriage 37 and the clamp undercarriage 49 are connected by a coupling linkage 39. Thus as the drive screw 36 turns, the clamp 31 moves back and forward.

Also pictured in FIG. 5 a front view of the torch 51 and the prepackage holder 81. The torch 51 is made from a machinable glass ceramic. Torches made from metal are required to be shut off after a fusing operation to prevent the heat buildup from melting the torch itself. Additionally the cycling of the torch as it is turned off and on causes contaminating particles to be generated. The torch 51 can be maintained in an ignited state during the manufacture of fiber optic couplers so that the fusing of optical fibers can be performed uniformly and reliably. The torch is also shaped and dimensioned for specific manufacturing requirements for a optical fiber coupler. One such torch, which is also useful for automated workstations, is described in U.S. patent Ser. No. 08/004,041, entitled, "A TORCH FOR MANUFACTURE OF OPTICAL FIBER COUPLERS AND METHOD OF MANUFACTURE," filed Jan. 15, 1993 by J. J. Pan et al and assigned to the present assignee.

FIG. 3 shows the torch 51, its flexible gas supply tube 52 and a control valve 53. The control valve 53 is connected to a source (not shown) of gas, typically hydrogen, so that gas is supplied through the tube 52 to the torch 51. Also associated with the heating and fusion subsystem 50 is a safety gas sensor 54 which is coupled to the control valve 53. The gas sensor, such as Part No. 2001-00, from Sierra Monitor Corporation of Milpitas, California, detects the presence of gas. If the concentration of gas exceeds a predetermined level, the sensor activates an alarm and emits a signal to the valve 53 to shut off the gas supply. Note that the drive mechanism for the torch 51 is not shown since the design of such a mechanism is a straightforward matter.

Likewise the drive mechanism for the prepackage holder 81 is not shown. The holder 81 is trough-shaped, into which fits a prepackage, a glass half-tube. Normally the holder 81 rests out of the way below the clamps 31 and fibers 100. For a packaging operation the holder 81 rises to set a prepackage in slight contact with the fibers 100 between the clamps 31. Electric heating elements in the metal holder 81 help cure epoxy used on the fibers 100 and prepackage.

The process monitoring camera and display subsystem 90, which has the video camera 91, with a microscope lens, connected to the monitor 92. The camera 91 is focused upon the coupling region of the coupler to be formed between the clamps 31, as shown in FIG. 3. The camera 91 allows an operator to observe the minute details of the formation of the coupler during the manufacturing process on the monitor 92.

Figure 6A:
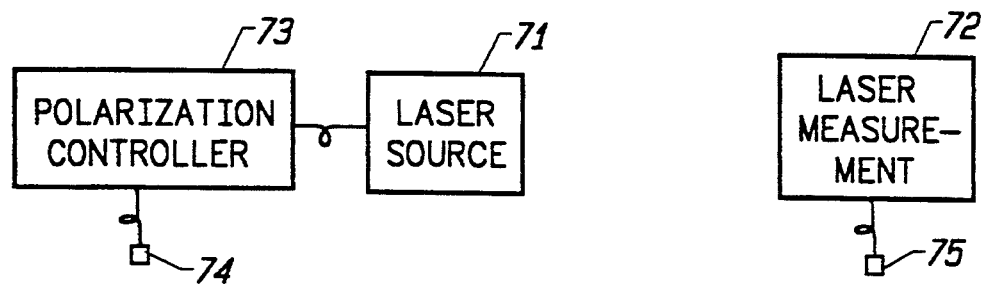
FIG. 6A is a block diagram of the laser source and measurement subsystem of the operations unit of FIG. 2.

FIG. 6A shows the organization of the laser source and measurement subsystem 70, which has a laser source block 71, a laser measurement block 72, and a polarization controller block 73. The laser source block 71 has a Fabry-Perot laser diode unit having an output connected to a fitting 73. Laser diodes units of 850 nm, 1300 nm, 1310 and 1550 nm wavelengths may be used for a desired optical wavelength. The output from the laser source block 71 is sent by an optical fiber to the polarization controller block 73. As the name implies, the block 73 controls the state of polarization of the optical signal from the laser source block 71. The output signal from the block 73 is connected by optical fiber to a connector fitting 74.

Figure 6B:
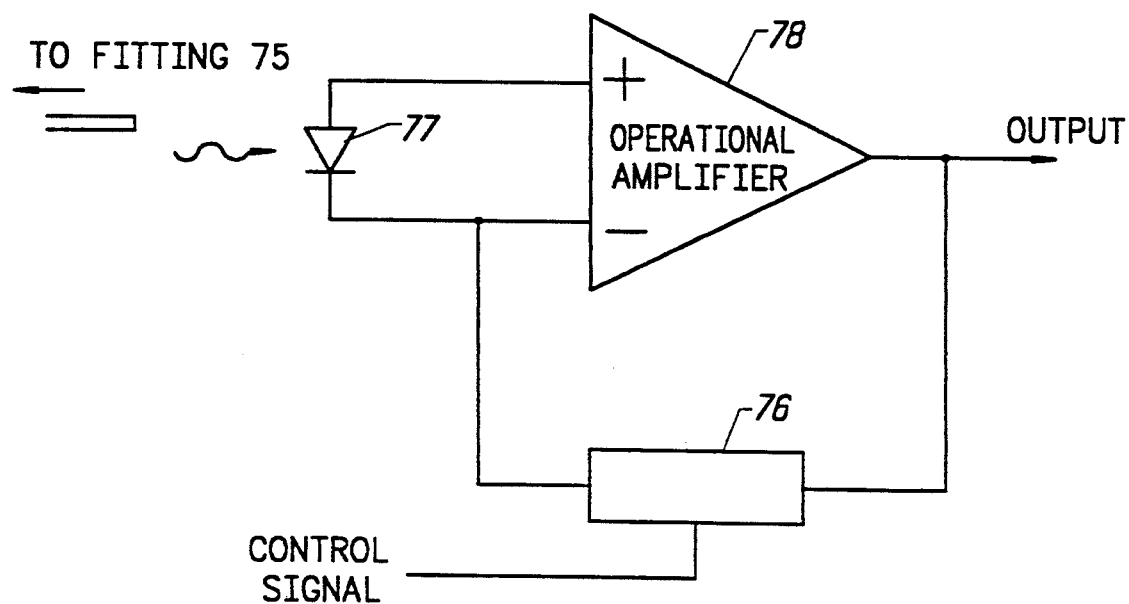
FIG. 6B shows the details of the laser measurement block of the subsystem of FIG. 6A.
Figure 6C:
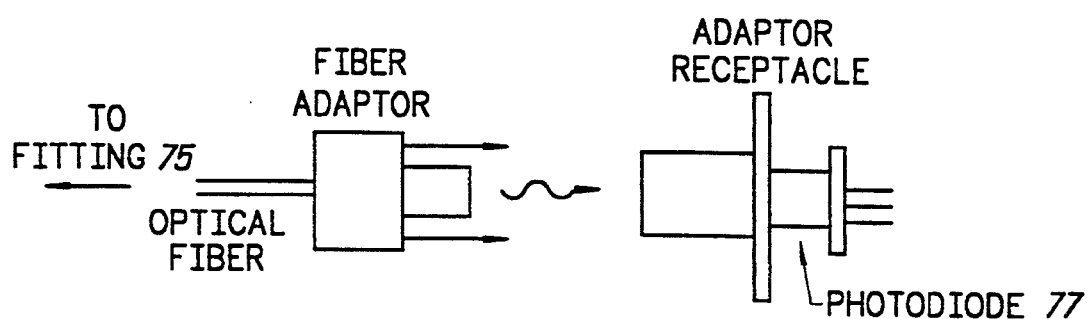
FIG. 6C details the adaptor fitting of an optical fiber to the photodiode in the block of FIG. 6B.

The laser measurement block 72 measures the strength of an optical signal received through a connector fitting 75, which is mounted to the front of the workstation. See FIG. 1. As shown in FIG. 6B, light from the fitting 75 is directed toward a photodiode 77. FIG. 6C illustrates the bare fiber adaptor used to hold the end of the optical fiber connected to the fitting 75 in place with respect to the photodiode 77. The output terminals of the photodiode 77 are connected to the input terminals of an operational amplifier 78. By setting the magnitude of the resistance between the output terminal and the negative input terminal of the amplifier 78, as represented by a programmable resistance block 76, the amplification factor for the output of the photodiode 77 may be selected. The design of circuits having resistances which may be set or programmed are well known to circuit designers.

Figure 6D:
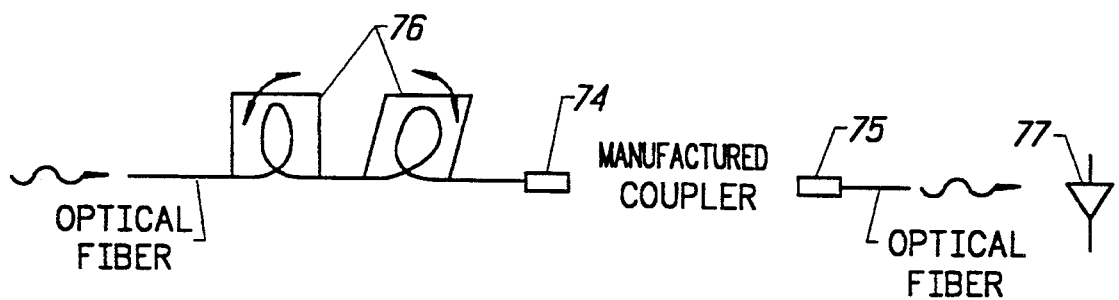
FIG. 6D illustrates the details and operation of the polarization controller block of the subsystem of FIG. 6A.

The polarization controller 73 is formed by an optical fiber which receives the light from the laser source block 71. The fiber is coiled by two plates 76, one of which holds a quarterwave coil and the other plate holds a halfwave coil, as shown in FIG. 6D. The amount of mechanical rotation of the plates 76 about an axis in the plane of the coils is translated into a rotation angle of polarization of the light being emitted from the laser source. A description of this type of polarization controller is found in, "In-line single-mode fiber polarization controllers at 1.55, 1.30, and 0.63 $\mu$m," by Birgit G. Koehler and John E. Bowers, *Applied Optics*, vol. 24, no. 3, Feb. 1, 1985, pp. 349–353. During a test of a coupler being manufactured, the plates 76 are rotated about a wide arc by a motor (not shown) to test the change in the coupling ratio of the coupler with respect to the polarization of light passing through the coupler. The amount of light received by the photodiode 77 of the light measurement block 72 with respect to the rotation of the plates 76 yields the sensitivity of the manufactured coupler to the polarization of light.

FIG. 1 illustrates how the laser source and measurement subsystem 70 is connected during the manufacture of a coupler. One end of the optical fibers 100 is terminated with a connector which is inserted into the output fitting 74 of laser source and measurement subsystem 70. Note that the fiber is coiled by a supply spool 101. Another end of the optical fibers 100 is terminated with a connector which is inserted into the fitting 75. Thus, optical signals on this fiber 100, say 100A, are received by the photodetector 77. The output signal of the photodetector may be amplified by a selectable factor to monitor the signal on the fiber 100A. As shown in the drawing, there are multiple fittings 74 and 75 so that each fiber of the manufactured coupler can be supplied and measured with light.

Referring to FIG. 2, the input/output communication and control subsystem 20, a conduit through which the control unit 11 controls the subsystems of the operations unit 10 and receives information from them, is in the form of an adaptor card which is interfaced between the optical fibers 12 and the rest of the operations unit 10. The subsystem 20 translates light signals from one of the fibers 12 into electrical signals for the unit 10 and electrical signals generated in the unit 10 into optical signals for the other of the two fibers 12. In this manner, all of the subsystems 30, 50, 70, 80 and 90 communicate with the control unit 11.

Figure 7A:
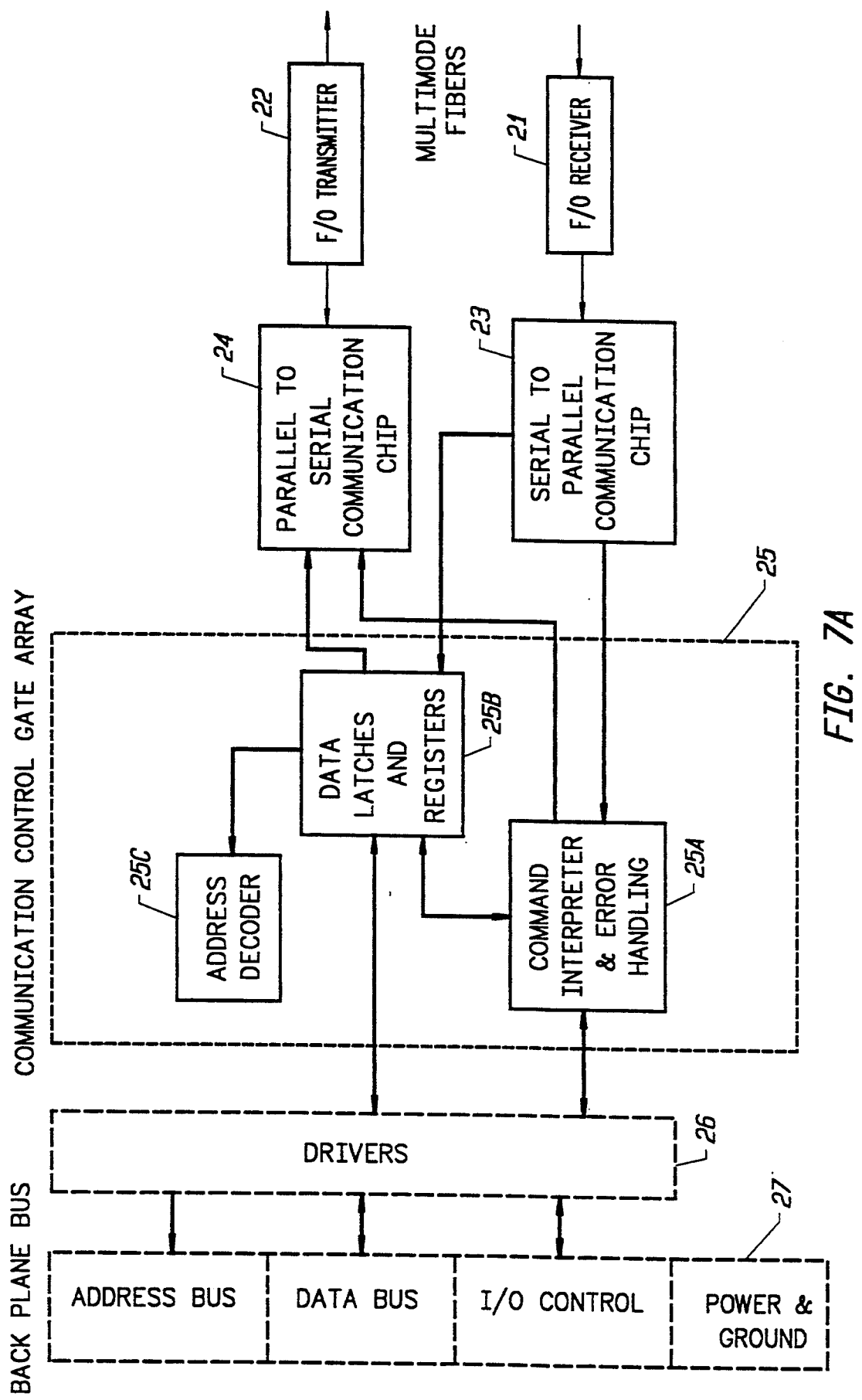
FIG. 7A is a block diagram of the input/output communication and control subsystem which is an interface between the linking optical fibers 12 and the operations unit 10.

FIG. 7A details the subsystem 20. Light signals are received by a fiber optic receiver 21 from one of the fibers 12 and transmitted by a fiber optic transmitter 22 to the other fiber 12. Transmission and reception occurs at a 72 Mbps data rate over these fibers 12. Part no. ODL70 from AT&T Microelectronics, Inc. of Allentown, Pa. is used for the receiver 21 and transmitter 22. The serial electrical signals, translated from the light signals by the receiver 21, are changed into parallel signals by a serial-to-parallel communication circuit 23, a TAXI integrated circuit from Advanced Micro Devices, Inc. of Sunnyvale, Calif. The parallel signals are sent to a communication control gate array 25, part no. TPC1010A from Texas Instruments, Inc. of Dallas, Tex. The array is organized into a command interpreter & error handling unit 25A, a unit 25B of data latches and registers 25B and an address decoder unit 25C. The data latch and register unit 25B is connected by bidirectional data paths to the command interpreter & error handling unit 25A and is also connected to the decoder unit 25C. The unit 25A receives signals from the serial-to-parallel communication circuit 23 and passes control signals to an input/output control portion of the backplane bus 27 of the operations unit 10 through driver circuits 26. The data latch and register unit 25B also receive signals from the serial-to-parallel communication circuit 23 and sends data signals through the driver circuits 26 to the data portion of the backplane bus 27. The address decoder unit 25C sends address signals to the address portion of the bus 27 through the driver circuit 26. The driver circuit 26 is formed by a standard parallel driver integrated circuit. Such circuits are supplied by many semiconductor companies. For completeness' sake, the backplane bus 27 is also shown with power and ground lines.

Communication from the unit 10 to the fiber 12 is performed from the input/output control and the data portions of the backplane bus 27 through the driver circuit 26 to the command interpreter & error handling unit 25A and the data latch and register unit 25B respectively. Both units 25A and 25B are connected to a parallel-to-serial communication circuit 24, another TAXI integrated circuit from Advanced Micro Devices, Inc. The serial signals from the circuit 24 are send to the fiber optic transmitter 22 for transmission on the fiber 12.

The communication control gate array 25 is formed by programming various different integrated circuits, which are now available to a electrical system designer. Besides the part from Texas Instruments, other circuits which may be used for the gate array 25 include Programmable Array Logic integrated circuits, such as a 22V10 from Advanced Micro Devices, and a Field programmable Gate Array from Actel, Inc. of Sunnyvale, Calif.

Figure 7B:
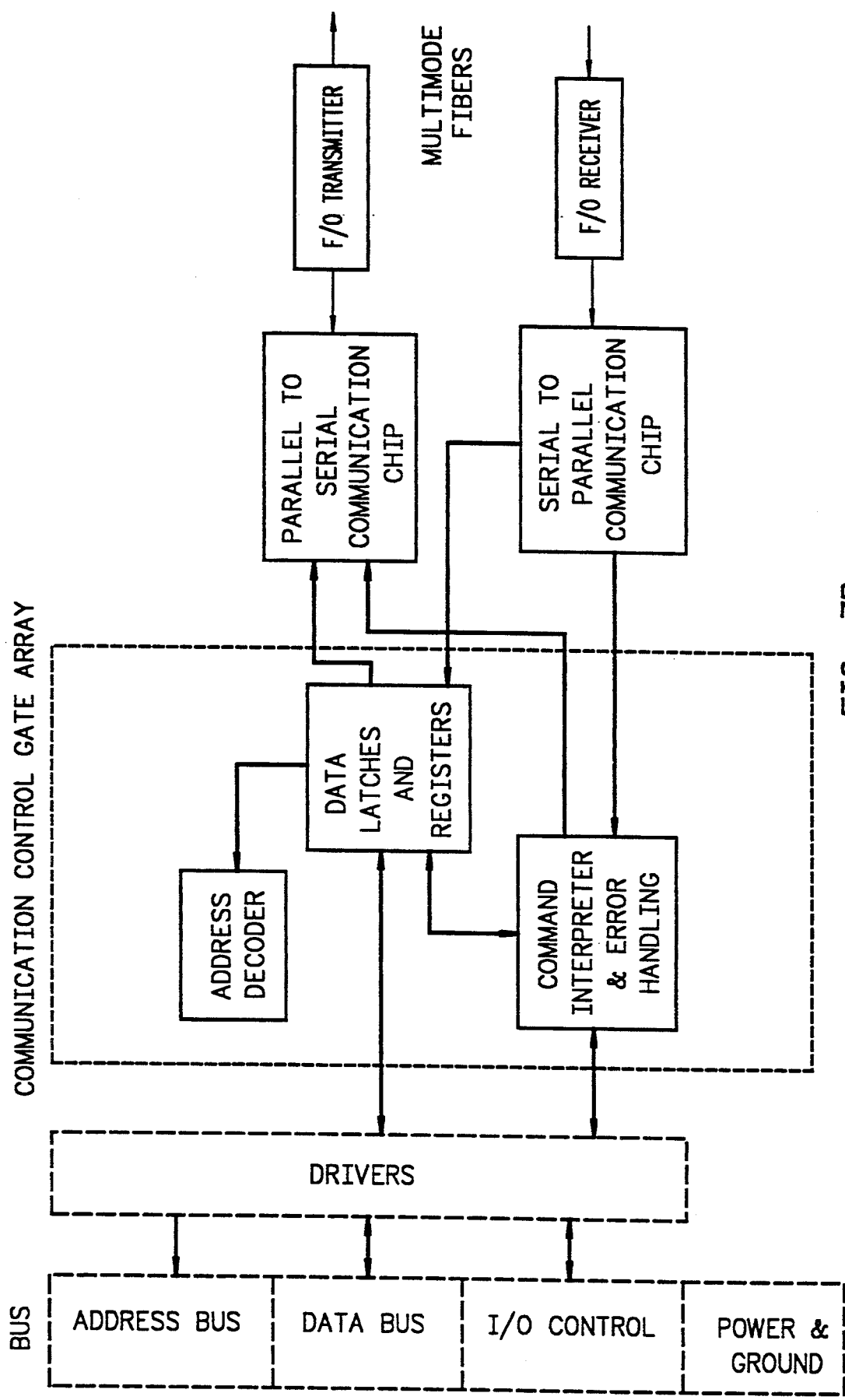
FIG. 7B is a block diagram of the interface between the linking optical fibers 12 and the control unit 11.

The control unit 11 likewise requires an interface unit to the fiber 12 for communication to the operations unit 10. FIG. 7B shows the organization of the interface unit to the fiber 12. Except for the reversal of some of the signal paths, it is nearly identical to that shown in FIG. 7A. Hence, no further explanation is made for the interface unit.

The control unit 11 is an IBM-type personal computer with a special interface to the operational unit 11, as explained previously. The control unit 11 has a central processing unit, an 80486 microprocessor from Intel Corporation of Santa Clara, Calif., two floppy disk drives, a hard disk drive, a monitor, a video acceleration card for the Windows computer program discussed below, a keyboard, and a mouse, all of which interface on a bus. This type of computer with these components are commonly available. Also connected to the bus is a specially designed fiber optic interface unit in the form of an adaptor card for the optical fiber 12 to the operational unit 10.

The operating system program of the control unit 11 is the common combination of MS-DOS, version 5.0, and Windows, version 3.1, both from Microsoft Corporation of Redmond, Wash. The Windows program provides a graphical user interface which permits the user to easily operate the workstation. Other operating systems could be used, whether custom or commercially available.

Under the operating system are the applications programs which direct the operations unit 10. Each applications program is designed for a particular type of fiber optic coupler. Within the program there is parameter selection, such as coupling ratio, insertion loss and wavelength, which allows a coupler to be adapted for a particular use.

Before the workstation is engaged, however, the fibers are first prepared. The protective jacket is removed from the section of the fibers where the coupler is to be formed. Any fibers which must be pretapered are heated and stretched on the workstation. Then the steps for manufacturing the coupler itself are started. After the vacuum to the clamps 31 is turned on to hold a predetermined number of fibers 100 in place, the clamps 31 are driven apart to pull on the fibers 100 in a controlled manner. The tension on the fibers 100 affects the power coupling ratio of the coupler being formed. The coupling ratio is monitored by the strength of the optical signal to the photodiode 77. When the specified coupling ratio is reached, the clamps 31 stop and maintain the fibers 99 in place. The torch 51, which has been ignited, moves forward and heats a portion of the fibers to fuse them together.

A prepackage, a half-cylindrical tube, is manually placed into the pre-packing holder 81. The vacuum to the holder 81 is turned on and the holder 81 moves to the fibers 100 so that the prepackage holds the fibers 100. Thermal epoxy is applied at the two ends of the tube. The heating element in the holder 81 is turned on for a specified amount of time to cure the epoxy. The vacuum to the holder 81 is turned off and the polarization test is performed.

After the polarization test, the vacuum to the clamps 31 is turned off and the coupler in its prepacking tube is manually removed from the workstation for the final packaging steps. Finally, the workstation reinitializes itself to return all parts, such as the clamps 31, to the initial state to begin the manufacturing cycle over again.

In the workstation each of these operational steps are performed automatically. FIGS. 8A-8E display the operational steps for manufacturing a fiber optic coupler in the described workstation in pseudocode form. The workstation starts with the Fabrication Program in FIG. 8A which initializes the workstation. The term, PD, refers to the photodetector 77; the term, CR, to the coupling ratio, i.e., the ratio of the amount of light in an output fiber of the manufactured coupler to the amount of light in an input fiber of the coupler; and the term, EL, refers to excess loss, the amount of light which lost after passing through the coupler. The pulling motor refers to the motor which drives the vacuum clamps 31. Finally the buttons referred to are displays of buttons, or icons, in the terminology of the Windows operating system, by which other programs are started, or launched, when "clicked" by the arrow cursor.

These programs, or operation buttons, are described below. RECAL recalibrates the clamp motor positions. The "database" referred to is discussed below. HOME moves the clamps 31 and prepackaging holder 81 into starting position. PPULL places the torch 51 into a ready position as the clamps 31 move away from each other a predetermined amount. PULL moves the torch 51 into position and the clamps 31 are moved apart. The PULL++ program moves the clamps 31 apart by a predetermined amount. PACK is the packaging program by which the holder 81 moves into position. In DEPACK the vacuum of the holder 81 is turned off and returned to its home position. PST is the polarization test program. The program rotates the quarterwave plates 76 of the controller 73 as the output of the photodiode 77 (PD) is recorded for each step of the rotation. A polarization value is obtained by the maximum deviation of the coupling ratios for all the steps of rotation. A special NEXT button, whose pseudocode is shown in FIG. 8C, is defined to further simplify operations. For a routine process the NEXT button ensures the correct procedure to follow and thereby maintains high production yields. The ZERO program records the offsets for the photodiode 77. The offsets are used to calibrate the photodiode 77. The STOP button stops the current operation and, depending upon the operation, moves to a different one, as indicated in FIG. 8D, before returning to the Fabrication Program. The EXIT button quits the Fabrication Program.

The Fabrication Program also has other groups of buttons, including Vacuum Buttons and Heater Buttons. The Vacuum Buttons include a PULL LEFT button which toggles the vacuum of the left clamp 31 off and on, and a PACKAGE button, which toggles the vacuum of the prepackage holder 81 off and on. The Heater Buttons include an ON/OFF button which toggles the heater of the holder 81 off and on, and an AUTO button, which turns off the heater of the holder 81 for a predetermined amount of curing of epoxy on the prepackage.

It should be noted that the steps described above are for the general manufacture of a fiber optic coupler. The details in preparing the fibers 100 and in arranging them before loading into the clamps 31 all contribute to the performance of the finished coupler. For example, an explanation of a particular 2×2 coupler is found in U.S. patent Ser. No. 08/004,043, entitled, "BROAD BANDWIDTH, SINGLE-MODE FIBER OPTIC COUPLER AND METHOD OF MANUFACTURE THEREFOR," filed Jan. 15, 1993 by J. J. Pan et al. and assigned to the present assignee. The workstation according to the present invention permits the steps of clamping, heating, pulling, fusing, and prepackaging the coupler to be precisely specified for the optimum performance of the desired coupler for automated execution.

The control unit 11 also collects data from the manufacturing process into a database. From the specified records and fields of the database, information, such as yield, quality distribution, productivity, and diagnostics, are provided for the manufactured coupler units. FIG. 9A-9B describes the database program which collects the manufacturing data in pseudocode form. The Fabrication Data file shows the fields of records in that file. The Qualified Records Data file is another data file, which is used to help set aside records in the Fabrication Data file. The Statistical Analysis file performs the requested analysis of the manufactured couplers from the Fabrication Data file. The Display Qualified Records file and Print Qualified Records file respectively display and print out the records from the Qualified Records Data file.

Thus with the described workstation, high volumes of high quality, highly reliable fiber optic couplers may be manufactured at low cost. The precision of the operation of the workstation permits couplers to be manufactured with high yields and the programmability of the workstation allows operations to be performed with flexibility and ease.

While the above is a complete description of the preferred embodiments of the present invention, various alternative, modifications and equivalents may be used. It should be evident that the present invention is equally applicable by making appropriate modifications to the embodiments described above. Therefore, the above description should not be taken as limiting the scope of the invention which is defined by the metes and bounds of the appended claims.

What is claimed is:

1. A workstation for automatically forming a coupling region between at least two optical fibers, said workstation comprising
   control means for directing operations of said workstation;
   a pair of clamps for holding said optical fibers for the formation of said coupling region between said clamps;
   means responsive to said control means for heating a predetermined length of said fibers between said clamps to fuse said length;
   means responsive to said control means for driving said clamps;
   means responsive to said control means for generating a selectable input signal into said optical fibers; and
   means for monitoring an output signal responsive to said input signal to determine characteristics of said coupling region between said optical fibers;
   whereby fiber optic couplers are automatically manufactured.

2. The workstation as in claim 1 further comprising means responsive to said control means for positioning and holding a package for said coupling region fibers, 3. The workstation as in claim 2 wherein said positioning and holding means further comprises means for heating said package for thermally curing epoxy;

4. The workstation as in claim 1 further comprising means for recording monitored output signals and determined characteristics for each fiber optic coupler manufactured, 5. The workstation as in claim 4 further comprising means for placing said monitored output signals and determined characteristics into records and fields to form a database of said manufactured fiber optic couplers.

6. The workstation as in claim 5 further comprising means for calculating statistical data from said records and fields for said manufactured fiber optic couplers.

7. The workstation as in claim 1 wherein said control means is physically separated from said operations area.

8. The workstation as in claim 7 wherein said control means communicates with said operations area by an optical fiber.

9. The workstation as in claim 1 wherein said heating means comprises a torch connected to a gas supply and further comprising means for detecting a gas concentration over a predetermined amount.

10. The workstation as in claim 9 further comprising means responsive to said detecting means for turning off said gas supply.

11. A method of automatically manufacturing a fiber optic coupler of at least two optical fibers, said method comprising
    defining operational parameters for said fiber coupler;
    mounting on a pair of clamps a prepared section of said optical fibers for a coupling region with said coupling region therebetween;
    heating a section of said optical fibers to fuse said fibers together responsive to said defined operational parameters;
    driving said clamps apart responsive to said defined operational parameters;;
    generating an input signal into said optical fibers, said input signal selected by said defined operational parameters;
    monitoring an output signal responsive to said input signal as said clamps are driven apart to determine at least one operational parameter;
    stopping said clamps when said one operational parameter matches a defined operational parameter;
    whereby a fiber optic coupler is manufactured by automation.

12. The method as in claim 11 further comprising automatically positioning and holding a package for said coupling region of said fibers after said stopping step.

13. The method as in claim 12 further comprising heating said package for thermally curing epoxy after said positioning and holding step.

14. The method as in claim 11 comprising recording monitored output signals and determined characteristics for each fiber optic coupler manufactured.

15. The method as in claim 14 placing said monitored output signals and determined characteristics into records and fields to form a database of said manufactured fiber optic couplers.

16. The method as in claim 15 further comprising calculating statistical data from said records and fields for said manufactured fiber optic couplers.

17. The method as in claim 11 wherein said control means is physically separated from said operations area.

18. The method as in claim 17 wherein said control means communicates with said operations area by an optical fiber.

19. The method as in claim 11 wherein said heating step comprises using a torch connected to a gas supply and said method further comprises detecting a gas concentration over a predetermined amount.

20. The method as in claim 19 further comprises turning off said gas supply responsive to said detecting step.

* * * * *